(12) United States Patent
Propheter-Hinckley et al.

(10) Patent No.: US 8,087,447 B2
(45) Date of Patent: Jan. 3, 2012

(54) METHOD FOR CHECKING WALL THICKNESS OF HOLLOW CORE AIRFOIL

(75) Inventors: Tracy A. Propheter-Hinckley, Manchester, CT (US); Craig R. McGarrah, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 764 days.

(21) Appl. No.: 11/589,581

(22) Filed: Oct. 30, 2006

(65) Prior Publication Data

US 2008/0099178 A1    May 1, 2008

(51) Int. Cl.
*B22D 29/00* (2006.01)
*B22C 9/10* (2006.01)
(52) U.S. Cl. .................... 164/132; 164/369
(58) Field of Classification Search .......... 164/516, 164/132, 368, 369; 416/232
See application file for complete search history.

(56) References Cited

U.S. PATENT DOCUMENTS

| | | | |
|---|---|---|---|
| 5,296,308 A * | 3/1994 | Caccavale et al. | 428/586 |
| 5,356,265 A | 10/1994 | Kercher | |
| 5,950,705 A | 9/1999 | Huang | |
| 6,530,416 B1 | 3/2003 | Tiemann | |
| 6,805,535 B2 * | 10/2004 | Tiemann | 416/233 |

FOREIGN PATENT DOCUMENTS

| | | |
|---|---|---|
| DE | 19821770 | 4/1999 |
| EP | 0365195 | 4/1990 |
| EP | 1559500 | 8/2005 |
| EP | 1655454 | 5/2006 |
| WO | 98/05921 | 2/1998 |

OTHER PUBLICATIONS

European Search Report Dated Nov. 22, 2007.
Y. Le Bihan, Wall Thickness Evaluation of Single-Crystal Hollow Blades by Eddy Current Sensor, NDT & E International, Jul. 5, 2001, pp. 363-368, vol. 34, issue No. 5.

* cited by examiner

*Primary Examiner* — Kevin P Kerns
(74) *Attorney, Agent, or Firm* — Carlson, Gaskey & Olds, PC

(57) ABSTRACT

A molding technique is utilized to form the cooling channels in an airfoil for a gas turbine engine. The cooling channels are formed by lost core mold cores, which are leached away after metal has been molded around them. At least one of the mold cores is provided with a cone which will extend into the airfoil. The cone forms an opening in a wall of the airfoil, and the size of this opening is indicative of the thickness of the wall. By comparing the size to expected sizes, a determination can be made of whether the wall is of an acceptable thickness at locations where it is difficult to otherwise measure the wall.

7 Claims, 5 Drawing Sheets

METHOD FOR CHECKING WALL THICKNESS OF HOLLOW CORE AIRFOIL

This invention was made with government support under Contract No. N00019-02-C-3003 awarded by the United States Air Force. The government therefore has certain rights in this invention.

BACKGROUND OF THE INVENTION

This application relates to a method and apparatus for checking to ensure an acceptable wall thickness in a hollow airfoil, such as are utilized in gas turbine engines.

Gas turbine engines are known, and include a plurality of sections mounted in series. A fan typically delivers air downstream to a compressor, and the compressor compresses the air. The compressed air is delivered into a combustor section, where it is mixed with fuel and combusted. Products of the combustion move downstream over turbine rotors, and drive the turbine rotors to rotate.

The turbine rotors typically include a plurality of removable blades. The turbine rotors are separated by static vanes. The blades and vanes have an airfoil shape, and become quite hot from the products of combustion. To address the high temperatures, the airfoils are generally hollow with internal air cooling channels. Air is circulated through these air cooling channels.

In a typical method of forming the hollow airfoils, a plurality of lost core mold cores are placed within a mold. Molten metal then flows into the mold, and surrounds the mold cores. The mold cores are then leached away, leaving spaces where the mold cores were initially placed. From this, the metal forms the airfoil, and the spaces where the mold cores were received, form the air cooling channels.

The shape and design of the airfoils and the cooling channels has become more and more complex, and it has become difficult to check the wall thickness between the cooling channel and an outer surface of the airfoil. It is necessary to maintain the wall thickness within a tolerance range. It is undesirable to have the wall thickness be too thin, or too thick.

However, to date, it has been somewhat difficult to check the wall thickness in an airfoil, and in particular at certain locations within the airfoil.

SUMMARY OF THE INVENTION

In the disclosed embodiment of this invention, the mold core, which is formed as part of a lost core mold, is also formed with a cone that will leave a wall thickness indicator in the wall of the airfoil even after the mold core has been leached away. In one embodiment, the cone extends through the wall, such that a portion of the cone forms an opening in the wall, and an inspector can examine the size of the opening to ensure the wall thickness is proper.

In disclosed embodiments, the cone may be frusto-conical, such that the size of the opening in the wall increases as the thickness of the wall decreases. If the opening diameter is too small, this is an indication the wall is too thick. On the other hand, if the opening in the wall is too large, this is an indication that the wall is too thin.

These and other features of the present invention can be best understood from the following specification and drawings, the following of which is a brief description.

DETAILED DESCRIPTION OF THE PREFERRED EMBODIMENT

Figure 1A:
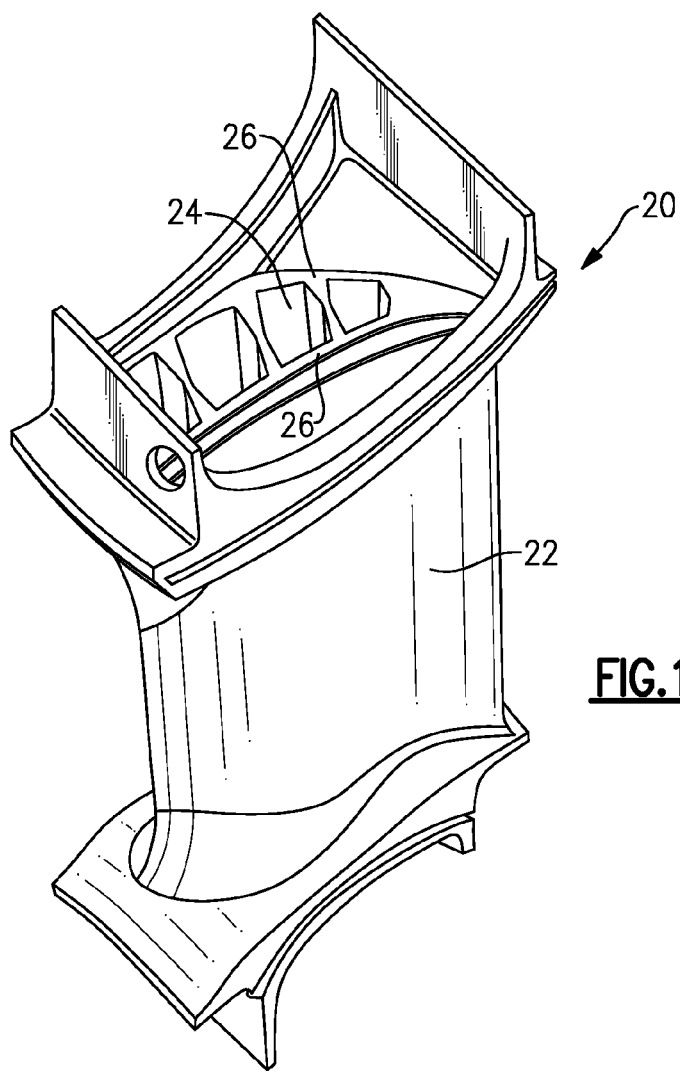
FIG. 1A shows a perspective view of a known turbine vane.

FIG. 1A shows a vane 20 such as may be utilized in a gas turbine engine. An airfoil 22 has internal cooling air channels 24 between walls 26.

Figure 1B:
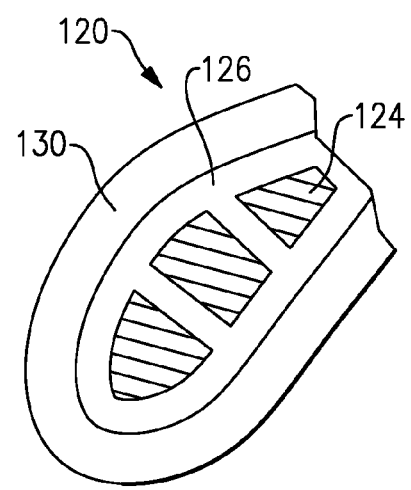
FIG. 1B schematically shows a mold for forming the FIG. 1A vane.

As shown in FIG. 1B, to form the airfoil, a mold 120 has an outer mold wall 130 with internal mold cores 124. Spaces 126 are defined between the walls 130 and mold cores 124. Molten metal is injected into the spaces 126, and the walls of the airfoil form between the plugs 124 and mold wall 130. The mold cores 124 are then leached away, leaving the metal, and the hollow channels 24. This is a simplified explanation of the molding process, but will serve to provide an understanding of this invention.

Figure 2:
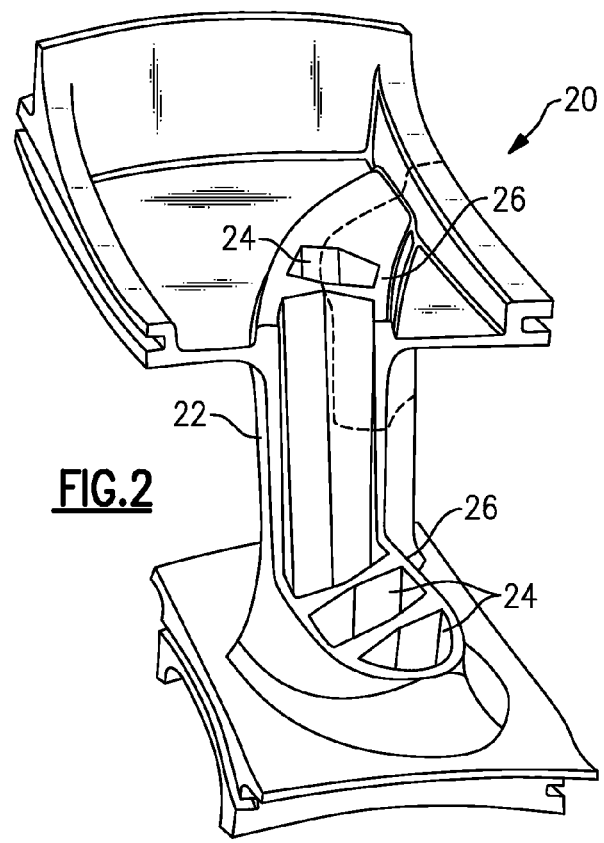
FIG. 2 shows a portion of the FIG. 1A vane.

FIG. 2 is a cut-away view of the vane 20. As shown, the walls 26 have many locations that are somewhat difficult to reach, such as for measuring wall thickness to ensure the proper formation of the wall.

Figure 3:
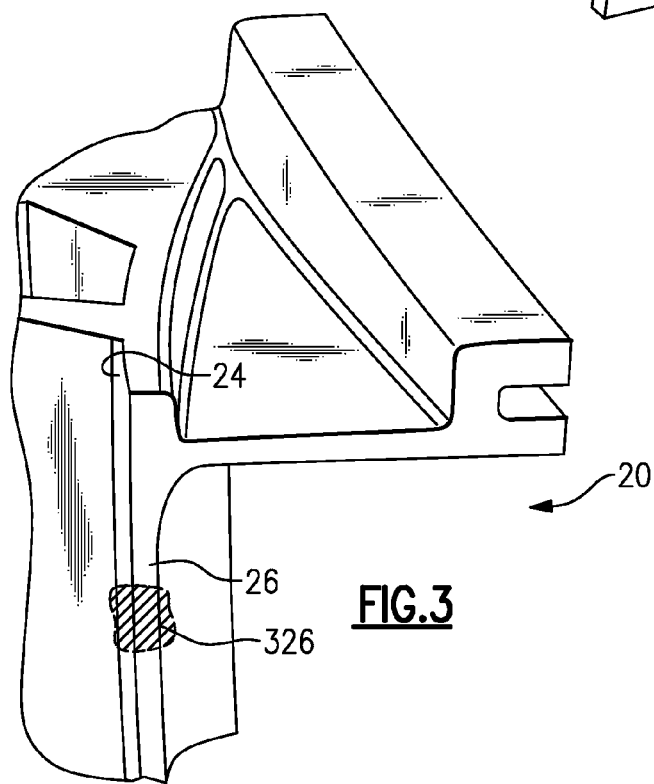
FIG. 3 shows another portion of the FIG. 1A vane.

FIG. 3 further shows a detail, and a location 326 of a wall 26 that would be desirably subject to measurement, to ensure an acceptable wall thickness. Still, location 326 is difficult to reach for measurement.

Figure 4:
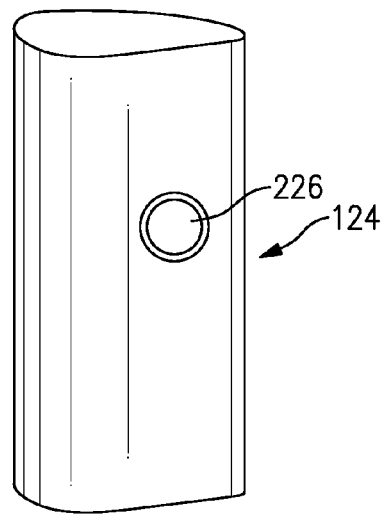
FIG. 4 shows a mold core for forming air channels within the vane.

FIG. 4 shows a feature of the present invention, and in particular an inventive mold core 124. Mold plug 124 is formed with a wall thickness inspection cone 226. FIGS. 5A-C, 6A-C, and 7A and B show various embodiments of the cone 226.

Figure 5A:
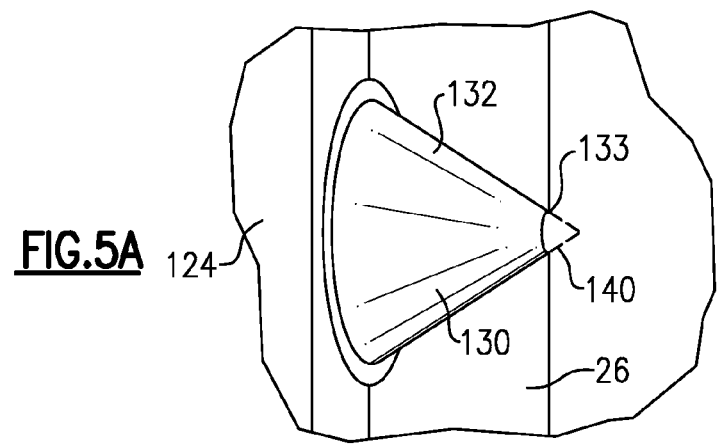
FIG. 5A shows a first embodiment of the FIG. 4 mold core and a first possible result.

As shown for example in FIG. 5A, a cone 130 has a frusto-conical shape, with outer walls 132. When the mold core has been leached away, an opening 133 will remain at the outer surface of the wall 26. As can be appreciated, the very tip of the cone 130, and as shown in outline at 140, will have extended through the wall 26. An inspector inspecting the vane as formed in the FIG. 5A attempt, will see that the opening 133 is smaller than is expected. Since the hole 133 is smaller than is expected, the inspector has an indication that the thickness of the wall 26 is too great.

Figure 5B:
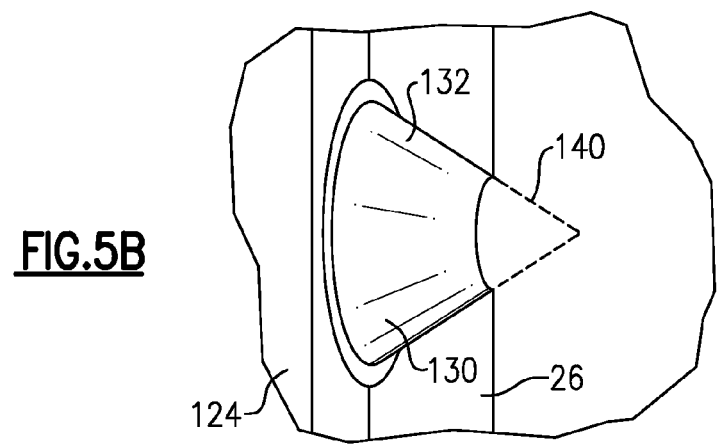
FIG. 5B shows another possible result.

Conversely, FIG. 5B shows another result, wherein the opening 133 is larger. As can be appreciated, the portion 140 of the cone that is extended through the wall 26 during the molding process is greater than in FIG. 5A. The hole size 133 would indicate that the wall thickness 26 is acceptable.

Figure 5C:
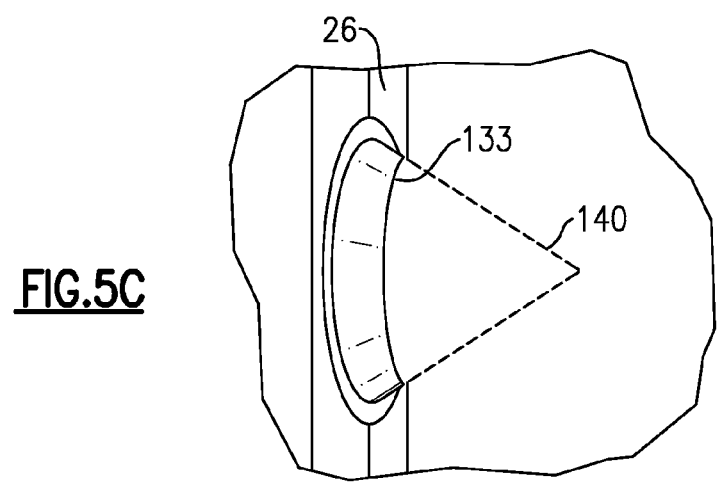
FIG. 5C shows yet another result that can be found with the first embodiment.

As shown in FIG. 5C, the opening 133 is much greater than in FIG. 5B. The portion 140 of the cone that has extended through the wall 26 is also much greater. It should be appreciated that none of the cone remains when the inspection is occurring, and only the opening 133. In the FIG. 5C result, the inspector can determine that since the opening 133 is so large, the wall thickness of wall 26 is too thin.

Figure 6A:
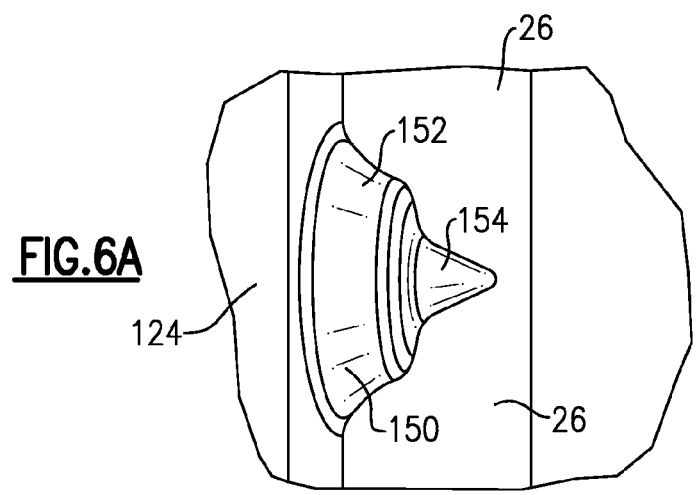
FIG. 6A shows a first result that can be found with the second embodiment.

FIG. 6A shows another embodiment cone 150. Embodiment 150 has an enlarged portion 152 and a smaller cone portion 154. As shown for example in FIG. 6A, if the cone 154 does not extend through the wall 26, the inspector knows the wall is too thick.

Figure 6B:
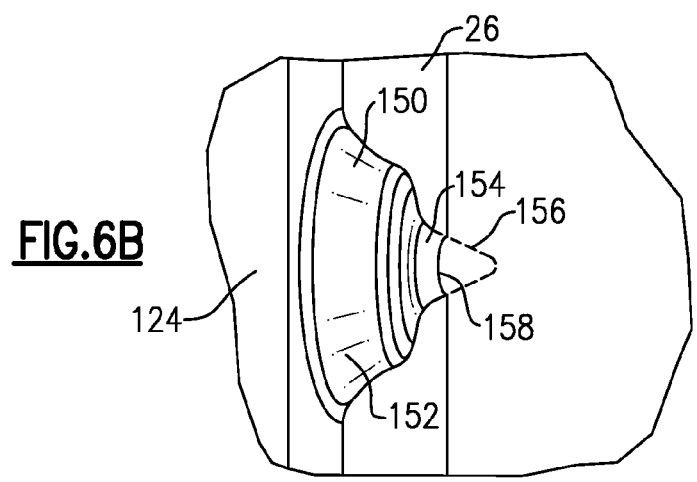
FIG. 6B shows a second result that could occur with the second embodiment.

As shown in FIG. 6B, the tip 156 of the cone 154 has extended through the wall and formed an opening 158. The inspector now knows that the wall thickness 26 in this result is appropriate, given the size of the opening 158.

Figure 6C:
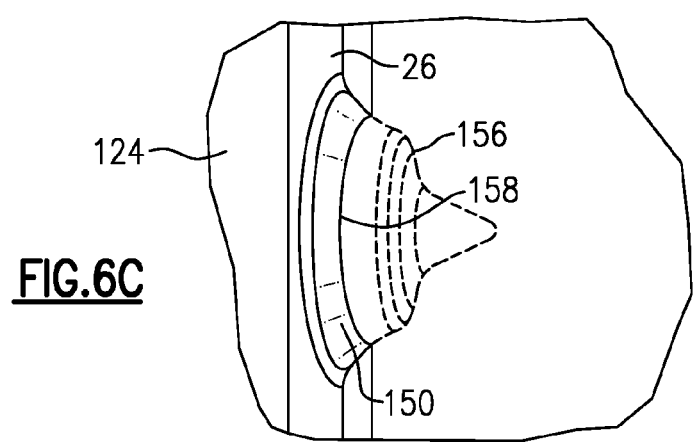
FIG. 6C shows a third result that could occur with the second embodiment.

As shown in FIG. 6C, should the enlarged portion 152 extend through the wall 26 such that the opening 158 is very large, the inspector will know the wall is too thin.

Figure 7A:
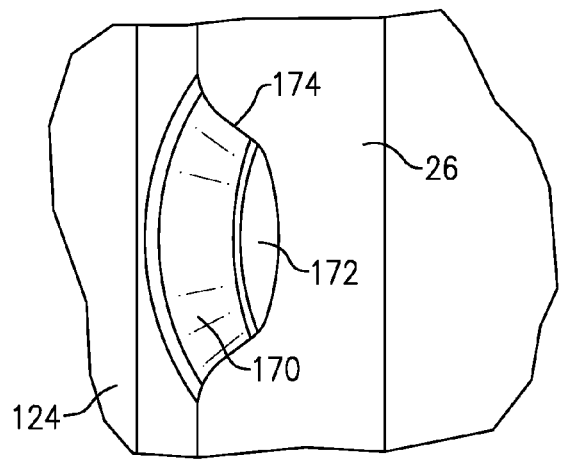
FIG. 7A shows a first result that can occur with the third embodiment.

FIG. 7A shows an embodiment wherein the cone 170 has a ramp 174 leading to a flat face 172. This embodiment can only show if a wall is too thin. As shown in FIG. 7A, since the cone has not broken through the wall 26, the inspector knows the wall is not too thin.

Figure 7B:
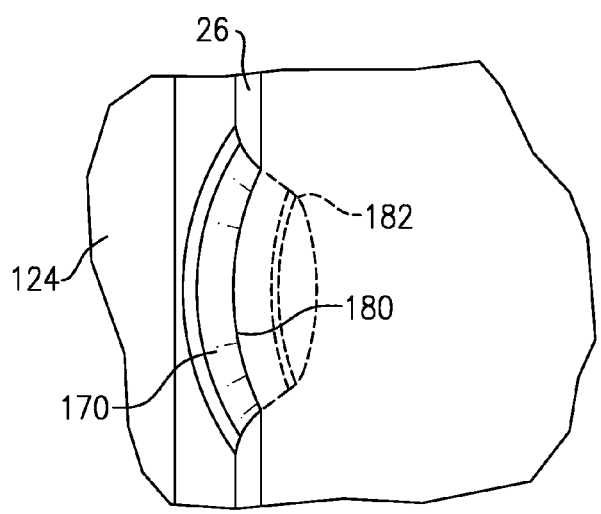
FIG. 7B shows a second result that can occur with the third embodiment.

On the other hand, as shown in FIG. 7B, if the cone 170 has broken through the wall 26 such that there is an opening 180, then the inspector knows the wall 26 is too thin. As shown, a portion 182 of the cone 170 would have extended through the wall.

The openings that may remain in the final airfoil are not of any functional concern in that they can be relatively small. These type airfoils are formed with film cooling holes, etc., and thus these few small additional holes would be of little concern. The features can be utilized at a plurality of locations across the airfoil, and in particular at critical locations where the wall thickness is a critical feature, and is difficult to measure. While the invention is specifically illustrated in a vane, it does extend to turbine blades. Also, the invention can extend to checking wall thicknesses at platforms, and other locations on the vane or blade rather than an airfoil. Along these lines, the invention can also be utilized in components not having specific airfoil structure such as a blade outer air seal.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of forming a component for a gas turbine engine comprising the steps of:
   (1) providing a mold, and providing at least one mold core within the mold to form internal cooling passages within the component;
   (2) directing a molten metal into the mold, said molten metal flowing between the mold and the mold core;
   (3) providing the mold core with a wall thickness indicator extending toward a portion of the mold wall, said wall thickness indicator being operable to leave a feature on the component after molding, with the feature providing an indication of an associated wall thickness in the component; and
   (4) leaching away the mold core, leaving the feature on the component, and inspecting the feature to determine whether the wall thickness is acceptable.

2. The method as set forth in claim 1, wherein said wall thickness indicator is a cone formed on the mold core.

3. The method as set forth in claim 2, wherein said cone has a conical surface, and the feature being an opening left in a wall of the component by the cone, with the size of the opening being indicative of the thickness of the wall.

4. The method as set forth in claim 3, wherein the cone is generally frusto-conical along its entire length.

5. The method as set forth in claim 3, wherein the cone has a first large diameter portion, and a second smaller diameter portion, and wherein if the opening is of the first large diameter, an inspector can determine the wall thickness is too thin.

6. The method as set forth in claim 1, wherein said component is a component having an airfoil, and the feature is on a wall of the component associated with the airfoil.

7. The method as set forth in claim 6, wherein the component is a stationary vane.

* * * * *